(12) United States Patent
Kim

(10) Patent No.: US 6,209,047 B1
(45) Date of Patent: Mar. 27, 2001

(54) RAM DATA TRANSMITTING APPARATUS AND METHOD USING A FIFO MEMORY WITH THREE FULLNESS FLAGS

(75) Inventor: Ki-Hong Kim, Incheonkwangyeok (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 08/743,072

(22) Filed: Nov. 4, 1996

(30) Foreign Application Priority Data

Nov. 3, 1995 (KR) .................................................. 95/39610

(51) Int. Cl.⁷ .................................................. G06F 13/14
(52) U.S. Cl. .................................................. 710/57; 710/52
(58) Field of Search .................................................. 395/877, 872; 365/189.05, 230.08; 710/57, 52, 53, 56, 60, 58

(56) References Cited

U.S. PATENT DOCUMENTS

| | | | |
|---|---|---|---|
| 4,864,543 | * 9/1989 | Ward et al. | 365/221 |
| 4,888,739 | * 12/1989 | Frederick et al. | 365/189.05 |
| 4,891,788 | * 1/1990 | Kreifels | 365/230.08 |
| 5,406,554 | * 4/1995 | Parry | 370/381 |
| 5,502,655 | * 3/1996 | McClure | 702/127 |
| 5,506,809 | * 4/1996 | Csoppenszky et al. | 365/221 |
| 5,640,515 | * 6/1997 | Park | 395/872 |
| 5,682,554 | * 10/1997 | Harrell | 395/877 |

* cited by examiner

*Primary Examiner*—Do Yoo
*Assistant Examiner*—Gary J. Portka
(74) *Attorney, Agent, or Firm*—Sughrue, Mion, Zinn, Macpeak & Seas, PLLC

(57) ABSTRACT

A RAM data transmitting apparatus transmits data from a RAM to an external host via a first-in first-out (FIFO) memory having a given storage capacity. RAM data is sequentially written into the FIFO in response to the generation of a write enable signal. If the RAM data is written in a first area of the FIFO smaller than the FIFO storage area, a first flag is generated. If the RAM data is written in a second area of the FIFO (the second area being smaller than the storage capacity but larger than the first area), a second flag is generated. If no RAM data is written into or remains in the FIFO (the FIFO is empty), a third flag is generated. A controller is provided which generates the write enable signal from the time the first flag goes low until the second flag is generated, whereby the RAM data stored in the RAM is written in the first-in first-out memory. A data access circuit is provided to allow continuous accessing of the RAM data from the FIFO memory, beginning from the time the second flag is generated until the third flag is generated.

7 Claims, 3 Drawing Sheets

RAM DATA TRANSMITTING APPARATUS AND METHOD USING A FIFO MEMORY WITH THREE FULLNESS FLAGS

BACKGROUND OF THE INVENTION

1. Field of the Invention

The present invention relates to devices for transmitting data stored in a RAM (random access memory), and more particularly to devices for transmitting data stored in a RAM after temporally writing the data to a FIFO (first input first output) memory, and method a thereof.

The present application for a RAM data transmitting apparatus using FIFO memory, is based on Korean Application Serial No. 39610/1995 which is incorporated herein by reference for all purposes.

2. Description of the Related Art

In general, a device such as a compact disk read only memory (CD-ROM) decoder is provided with an externally connecting RAM. For the RAM connected to the CD-ROM decoder, commonly referred to as a dynamic RAM, data applied from outside (data read from a compact disk) is processed by being temporally written and read as required when signed processing operations are to be performed on the data. That is, the CD-ROM decoder performs required actions such as error correction by reading data from outside which is written on a RAM and then writes the corrected data again on the RAM. The data written on the RAM after error correcting is accessed and processed by a host computer.

In accessing data written on a RAM (hereinafter called RAM data) by a host computer, an intervening first-in first-out memory (hereinafter, called FIFO) is generally used between the RAM and the host computer. In other words, when the access to the RAM data is required by the host computer, the RAM data to be transmitted is written on and then read out from the FIFO memory. Conventionally, this transmitting action is controlled by an empty flag and a full flag indicating the state of the FIFO. A controller for controlling the operation of the FIFO determines the state of the FIFO using these empty and full flags and applies request for RAM data transmitting to a RAM controller which controls the operation of the RAM. Then, according to the RAM data transmitting request signal received from the FIFO controller, the RAM controller writes the RAM data on the FIFO. The host computer reads the RAM data written on the FIFO until it receives an indication the FIFO is empty from the empty flag.

When a RAM data transmitting request signal is generated in response to the empty flag as mentioned above, the RAM controller causes RAM data to be written on the FIFO. When the RAM data is written on the entire contents of the FIFO, the full flag is generated and the RAM data transmitting request signal is stopped. At this time, the generation of the full flag is canceled when the host computer reads the data written on the FIFO, and the RAM data transmitting request signal is then generated again. When the host computer accesses the RAM data written on the FIFO at every time when the FIFO is full, the result is that the RAM data transmitting request signal occurs frequently, at a timing in proportion to the access times. However, since the RAM is being used in many ways, the frequent RAM data transmitting request signals inefficiently provide for few for the RAM chances to be used in the other ways. When the transmission of the RAM data is required when the FIFO becomes empty, the data access action of the host computer is blocked so long as the FIFO remains empty. Therefore, it is difficult to continuously access the data.

SUMMARY OF THE INVENTION

It is therefore, an object of the present invention to provide a RAM data transmitting apparatus and a method thereof by which a RAM can be used for other functions during transmission of RAM data.

It is another object of the present invention to provide a RAM data transmitting apparatus and a method thereof by which a host computer can continuously access the RAM data.

It is yet another object of the present invention to provide a RAM data transmitting apparatus and a method thereof by which system performance can be improved by reducing the occurrence of RAM data transmission request.

It is an additional object of the present invention to provide a RAM data transmitting apparatus which generates a RAM data transmission request when RAM data of an arbitrarily selectable predetermined amount is contained in a FIFO, as well as a method of operating the novel apparatus.

To achieve the above objects of the present invention, there is provided a first-in first-out memory (FIFO), having a storage area, which generates a first flag when RAM data is written in the FIFO so as to fill a first area smaller than the total FIFO storage area while the RAM data is written in the FIFO from the RAM in response to the generation of a write enable signal. The FIFO memory generates a second flag when the RAM data is written in the FIFO so as to fill in a second area smaller than the total FIFO storage area and larger than the first area, and also generates a third flag when there is no remaining RAM data contained in the FIFO. A RAM data transmitting apparatus writes the RAM data from the RAM into the FIFO when the first flag is generated till the second flag is generated, and continuously accesses the RAM data stored in the FIFO to a predetermined data access until the third flag is generated when the second flag is generated. As a result, the RAM can be used for another purpose.

To achieve the above objects of the present invention, there is provided a RAM (random access) data transmitting apparatus having a RAM; a first-in first-out memory (FIFO) having a storage area, for sequentially writing a RAM data stored in the RAM in response to the generation of a write enable signal, and generates a first flag if the RAM data is written to fill a first area smaller than the total storage area; generates a second flag if the RAM data is written to fill a second area smaller than the storage area and larger than the first area; and generates a third flag if no RAM data is written in the FIFO memory; a controller for, if the first flag is generated, generating the write enable signal till the second flag is generated, whereby the RAM data stored in the RAM is written in the first-in first-out memory; and a data access circuit for, if the second flag is generated, continuously accessing the RAM data written in the first-in first-out memory until the third flag is generated.

BRIEF DESCRIPTION OF THE DRAWINGS

In the detailed description of the preferred embodiment of the present invention presented below, reference is made to the accompanying drawings, in which.

DETAILED DESCRIPTION OF THE PREFERRED EMBODIMENT

A preferred embodiment of the present invention is discussed hereinbelow with reference to the accompanying drawings. In the description of the present invention, a detailed description of known functions and structures has been omitted to avoid unnecessarily obscuring the gist of the present invention. It should be noted that the terms and parameters as used hereinbelow are defined considering their functions in the described example of the present invention and can be varied according to the intention or practice of a user or a chip designer.

Figure 1:
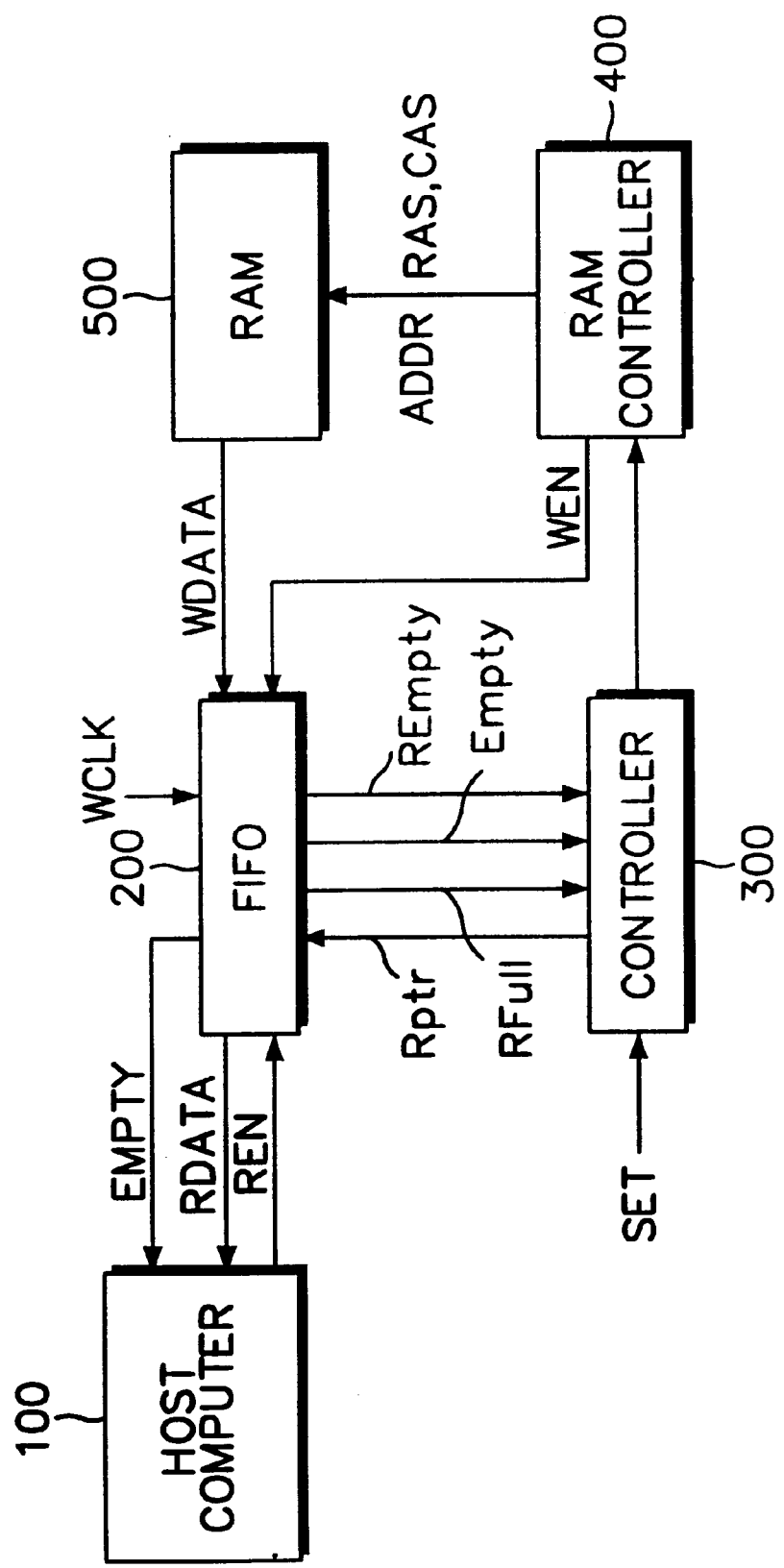
FIG. 1 is a block diagram of a RAM data transmitting apparatus according to the present invention.
Figure 3:
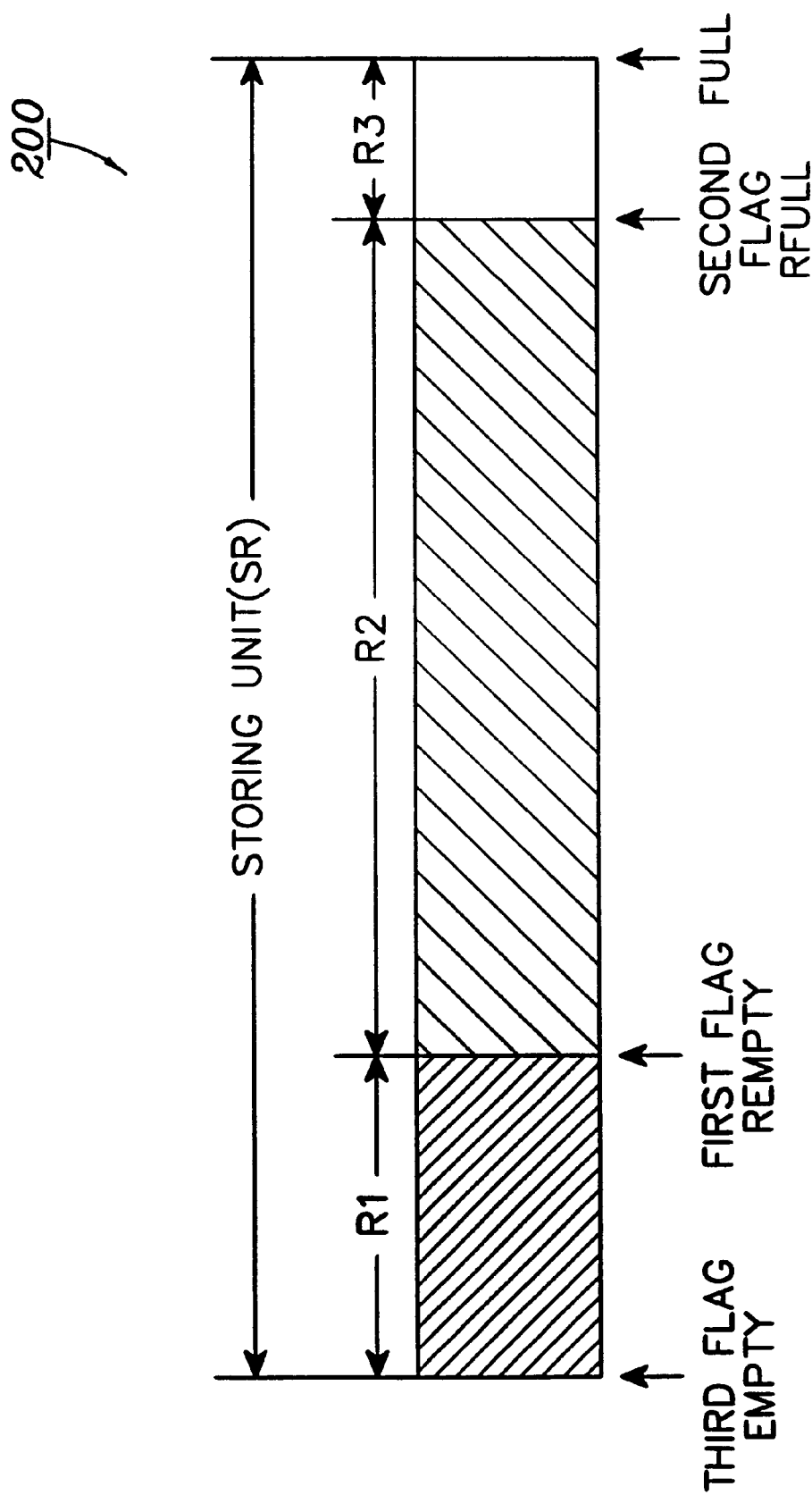
FIG. 3 shows the construction of the FIFO according to the present invention.

Referring to FIG. 1, the present invention is comprised of a host computer 100, a FIFO 200, a controller 300, a RAM controller 400 and a RAM 500. According to the present invention, the FIFO 200 generates flags REmpty and RFull. This is in distinction from a general FIFO, as illustrated in FIG. 3. The REmpty is a first flag which is generated when RAM data is stored in a first area R1 of the FIFO 200, and the RFull is a second flag which is generated when the RAM data is written to fill a second area R2 of the FIFO 200. The FIFO 200 generates Empty as in a general FIFO, which is a third flag indicating that data is not written in any area of the FIFO 200, i.e., it is empty. The size of the second area R2 of the FIFO 200 is set to be greater than that of the first area R1 but smaller than the total storage area SR of the FIFO 200. Preferably, the second area R2 is smaller than the total storage area SR, and the size of the first area R1 can be selectably set by a signal Rptr determined by applying a setting value "Set" to the controller 300.

Figure 2:
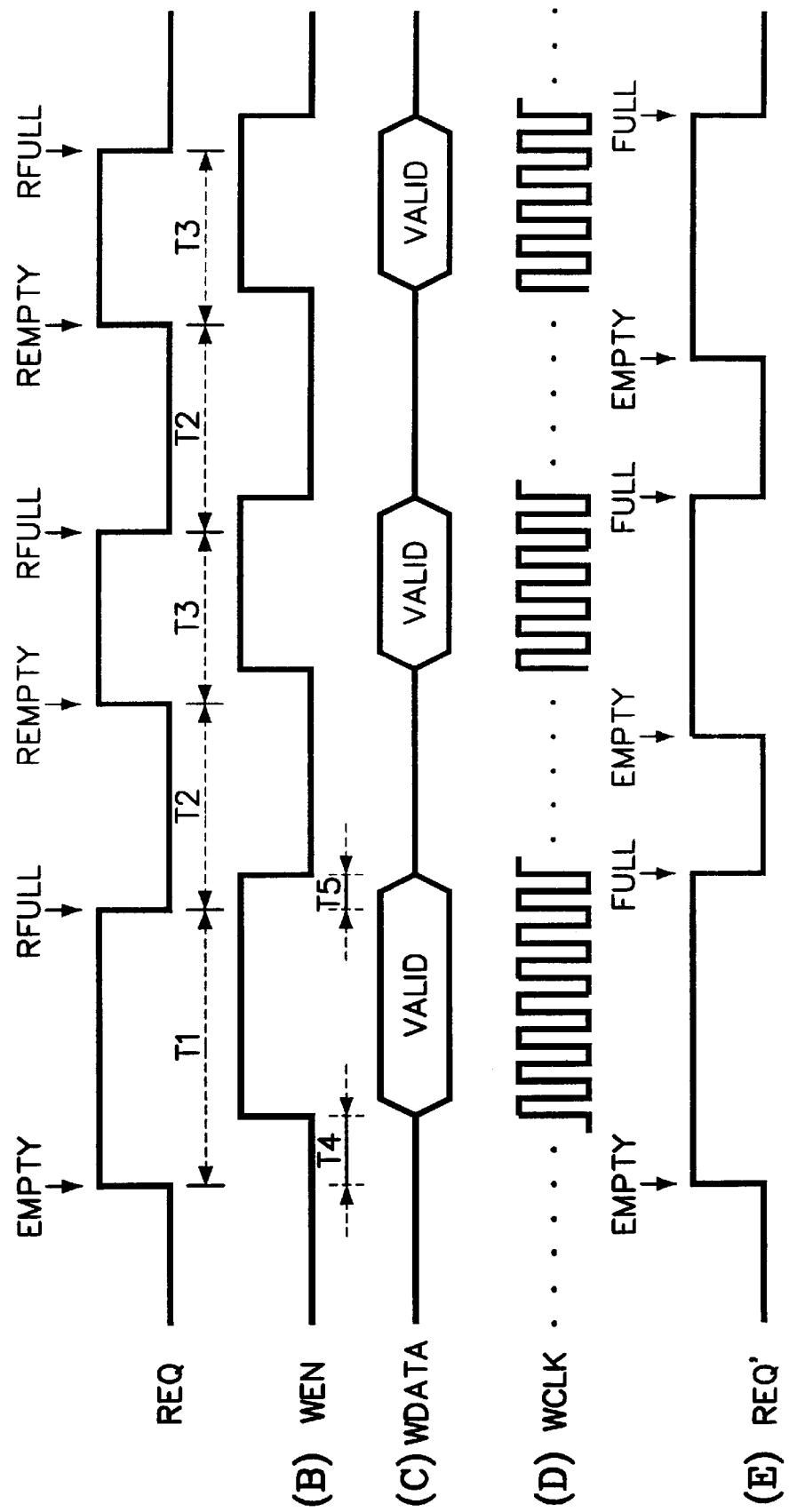
FIG. 2 shows a wave form timing diagram of operating wave forms according to the present invention.

FIG. 2 shows wave forms (A) through (E) of operation according to the present invention. Wave form (A) shows a RAM data transmitting request signal REQ generated from the controller 300 of FIG. 1. Wave form (B) shows a write enable signal WEN generated from the RAM controller 400. Wave form (C) shows a RAM data WDATA to be written on the FIFO 200. Wave form (D) shows a write clock WCLK input to the FIFO 200. Wave form (E) shows a RAM data transmitting request signal REQ' generated from even conventional FIFO.

Hereinabove, the RAM data transmitting request signal REQ represents the state of the first and second flags REmpty and RFull, and the RAM data transmitting request signal REQ' represents the state of the third flag Empty.

When a RAM data transmitting apparatus becomes active, the controller 300 makes the RAM data transmitting request REQ as shown as wave form (A) in FIG. 2 enable in response to a Empty flag generated from the FIFO 200. At this time, since no RAM data is written on the FIFO 200 (being empty), the host computer 100 does not perform an data access action. In response to the enabled REQ, signal the RAM controller 400 generates a RAS (row address strobe) signal and a CAS (column address strobe) signal to prepare the data stored in the RAM 500 to be capable of being written to the FIFO 200. An area in the RAM 500 is selected, where the RAM data is stored which to be written to the FIFO. Selection is made by an address signal, the RAS signal and the CAS signal, all generated by RAM controller 400. The time "T4" in wave form (B) is the time required in selecting the RAM data after the REQ is generated. After lapse of the time "T4", the RAM controller 400 generates the write enable signal WEN. Then, the selected RAM data WDATA is provided to the FIFO 200 to be written. At this time, the writing action being synchronized with the write clock WCLK, as shown in wave form (D), is continuously performed into a section of the FIFO when the WEN signal is generated.

When the RAM data is written to fill up the second area of the FIFO 200 by such writing action, the FIFO 200 generates a RFull flag. In response to the generation of the RFull flag, the controller 300 makes the REQ disabled to halt the RAM data writing action. At this time, after the REQ becomes disabled, the RAM data to be written is effective due to the data delay of the RAM 500. Thus, the RAM controller 400 makes the WEN disabled after time "T5" passed, as shown in wave form (B). The host computer 100 can continuously read if the Empty flag is not set. That is, RAM data from the FIFO 200 when the REmpty flag is generated is read before the Empty flag is generated. Hence, by appropriately adjusting the size of the first area the host computer 100 can continuously read the data without the generation of the Empty flag.

The RAM data written in the FIFO 200 is accessed by the generation of the read enable signal REN. Such an access action is halted in a case where the data which has been of the FIFO 200 corresponds to Empty by reading the RAM data.

The writing action, as described above, of the RAM data from the RAM 500 into the FIFO 200, is performed in a time period of t=(T1−T4+T5) as shown in wave forms (A) and (B) of FIG. 2. The RAM data written in the FIFO 200 is capable of being continuously read by the host computer 100. In other words, when the REmpty flag is generated, the RAM data stored in the RAM 500 is written in the FIFO 200 till the RFull flag is generated. When the Empty flag is released, the RAM data written in the FIFO 200 is accessible to the host computer 100 until the Empty flag is generated. Accordingly, in the present invention, the RAM 500 can be used for another purpose for a predetermined time period, while continuously transmitting data to the host computer 100. Thus, use of the RAM 500 is time multiplexed without loss of continuity of access to the RAM data by the host computer.

It is noted that the present invention can be appropriately used depending upon the kinds of data access means since the time periods T1, T2 and T3 shown in FIG. 2 can be changed according to a selection of FIFO (200) size, a setting value Set (size the first area in the FIFO) and the read/write speeds of the host computer 100 and the RAM 500.

As described above, the FIFO of the present invention generates and uses the REmpty and RFull flags and controls the transmission action of RAM data so that a RAM can be used for diverse purposes while the RAM data is continuously transmitted to an external host. Therefore, it has an advantage of improving the efficiency of the system.

It should be noted that the present invention is not limited to the preferred embodiment described above, and it is apparent that variations and modifications by those skilled in the art can be effected within the spirit and scope of the present invention defined in the appended claims. Therefore, it should be understood that the present invention is not limited to the particular embodiment disclosed herein as the best mode contemplated for carrying out the present invention.

What is claimed is:

1. An apparatus for transmitting data comprising:
   a first-in first-out (FIFO) memory having a storage capacity, for sequentially receiving data from a data storing unit in response to a write enable signal, wherein the FIFO memory has a first flag, a second flag, and a third flag as outputs, said first flag being generated when data from the data storing unit is written to a first portion of the FIFO memory, said first portion being smaller than said storage capacity of the FIFO memory, said second flag being generated when the data is written so as to fill a second portion of the FIFO memory, said second portion being smaller than said storage capacity of the FIFO memory and larger than said first portion, said third flag being generated when no data is contained in the FIFO memory;

controlling means for generating said write enable signal from when said first flag is generated until a time when said second flag is generated, wherein said write enable signal causes data stored in said data storing unit to be written into the FIFO memory, said controlling means disabling said write enable signal after a predetermined period after said second flag is generated; and a host computer for continuously accessing the data written in said FIFO memory, wherein a size of said first portion is adjustable by setting a setting value of said controlling means, so that the generation of said first flag and said second flag are adjustable depending on the size of said first portion, and said adjustable generation of said first flag allows said host computer to continuously access the data in the FIFO memory for a period of time after said second flag is generated and said predetermined period has elapsed, and subsequently until said third flag is generated, said period of time changing depending on said adjustable generation of said first flag and said second flag.

2. The apparatus as claimed in claim 1, wherein said second portion is smaller than said storage capacity.

3. The apparatus as claimed in claim 1, wherein said data storing unit is RAM.

4. An apparatus for transmitting data from a random access memory (RAM) comprising:

a first-in first-out (FIFO) memory having a storage capacity, for sequentially receiving RAM data from the RAM in response to a write enable signal, wherein the FIFO memory has a first flag, a second flag, and a third flag as outputs, said first flag being generated when RAM data from the RAM is written to a first portion of the FIFO memory, said first portion being smaller than said storage capacity of the FIFO memory, said second flag being generated when the RAM data is written so as to fill a second portion of the FIFO memory, said second portion being smaller than said storage capacity of the FIFO memory and larger than said first portion, said third flag being generated when no RAM data is contained in the FIFO memory;

RAM data transmission request signal generating means for generating a RAM data transmission request signal when said first flag is generated and until a time when said second flag is generated, and if said second flag is generated, blocking said RAM data transmission request signal until a first flag is again generated;

RAM controlling means for selecting RAM data to be written in the FIFO memory among the RAM data stored in the RAM in response to the generation of said RAM data transmission request signal and generating said write enable signal after the selection of the RAM data so as to write selected RAM data in said FIFO memory; and data access means for continuously accessing the RAM data written in the FIFO memory, wherein a size of said first portion is adjustable by setting a setting value of said RAM controlling means, so that the generation of said first flag and said second flag are adjustable depending on the size of said first portion, and said adjustable generation of said first flag allows said data access means to continuously access the RAM data in the FIFO memory after said second flag is generated, and during a period of time until subsequently said third flag is generated, said period of time changing depending on said adjustable generation of said first flag and said second flag.

5. The apparatus as claimed in claim 4, wherein said second portion is smaller than said storage capacity.

6. A method of writing RAM data stored in a RAM into a first-in first-out memory having a storage capacity and if there is a request of an access from data access means, transmitting the RAM data written in said first-in first-out memory to said data access means, said method comprising the steps of:

generating a first flag when the RAM data is written in a first area of the first-in first-out memory;

generating a second flag when the RAM data is written so as to fill a second area of the first-in first-out memory, said second area being larger than said first area and smaller than said storage capacity;

generating a third flag when no RAM data is written in the first-in first-out memory;

writing the RAM data stored in said RAM into the first-in first-out memory when said first flag is generated and until said second flag is generated;

accessing the RAM data written in said first-in first-out memory to said data access means, when said second flag is generated and in response to an access request of said data access means; and halting the accessing step when said third flag is generated, and adjusting a size of said first area so that the generation of said first flag and said second flag is adjustable depending on the size of said first area, and said adjustable generation of said first flag allows said data access means to continuously access the data in the first-in-first-out memory in said accessing step from a period of time after said second flag is generated until said third flag is generated and said halting step is conducted, said period of time changing depending on said adjusting step and said adjustable generation of said first flag and said second flag.

7. The method as claimed in claim 6, wherein said second area is smaller than said storage capacity.

* * * * *